Dec. 25, 1934.   F. STEBLER   1,985,555
FRUIT WAXING AND POLISHING MACHINE
Filed July 13, 1931   4 Sheets-Sheet 1

Inventor
Fred Stebler
By Lyon & Lyon
Attorneys

Dec. 25, 1934.   F. STEBLER   1,985,555
FRUIT WAXING AND POLISHING MACHINE

Filed July 13, 1931   4 Sheets-Sheet 2

Dec. 25, 1934.    F. STEBLER    1,985,555
FRUIT WAXING AND POLISHING MACHINE
Filed July 13, 1931    4 Sheets-Sheet 4

Inventor
Fred Stebler
By Lyon+Lyon
Attorneys

Patented Dec. 25, 1934

1,985,555

UNITED STATES PATENT OFFICE 1,985,555

FRUIT WAXING AND POLISHING MACHINE

Fred Stebler, Riverside, Calif., assignor to Food Machinery Corporation, San Jose, Calif., a corporation of Delaware Application July 13, 1931, Serial No. 550,325

17 Claims. (Cl. 91—18)

This invention relates to fruit waxing and polishing machines, and more particularly to a machine for applying wax to the surface of the fruit and for polishing the fruit surface after the wax has been applied thereto. As here used, the term "wax" is used to designate a coating material which, at normal atmospheric conditions, is of a non-fluid character.

In applying the wax to the surface of fruit, many attempts have been made to provide a machine or device for uniformly applying the wax to the surface of the fruit so that a coating of wax may be applied to the fruit in a uniform quantity so that the fruit may be polished with a film of wax over the surface of the fruit which is uniform and which may be applied to the fruit without any detrimental effects to the surface of the fruit.

In the applying of wax to the surface of the fruit, it has heretofore been found impossible to uniformly apply the wax due to the fact that wax will vary in consistency as the temperature changes so that if the wax is applied to the surface of the fruit under a uniform pressure of the wax against the surface of the fruit, greater quantities of wax are applied to the fruit as the consistency of the wax increases due to increased temperature, and results in the application to the surface of the fruit of too great quantities of wax during the warmer portions of the day, and too little wax being applied to the surface of the fruit during the cooler portions of the day.

An object of this invention is to provide a device for applying wax to the surface of fruit, including fruit conveying means and wax applying brushing means, and waxing means applicable to apply wax to the brushing means at a uniform constant rate.

Another object of this invention is to provide a machine for waxing and polishing fruit wherein means are provided for applying the wax to the fruit under normal atmospheric conditions present within a fruit packing house or the like, and which waxing means is operable to apply the wax to the fruit at a uniform constant rate independent of the consistency of the wax or non-fluid of coating material.

Another object of this invention is to provide a waxing machine which includes fruit brushing means and means for applying to the fruit brushing means wax at a uniform constant rate, and in which machine means are provided for varying or altering the wax applying means to alter the constant rate of application of the wax to the fruit brushing means.

Another object of this invention is to provide a fruit waxing and polishing means which includes a fruit conveying means including wax applying brushing means and means for applying wax to the fruit brushing means at a uniform constant rate independent of the consistency of the wax or non-fluid coating material.

Another object of this invention is to provide a machine for waxing and polishing fruit in which there is provided a plurality of rotating brushes providing a conveyor for the fruit to be waxed and polished, and means operable for the feeding of wax to the brushes at a uniform constant rate independent of the condition of consistency of the wax being fed to the brushes so that the wax will be uniformly applied by the brushes to the fruit being conveyed by the brushes independent of the temperature conditions existent where the machine is utilized, and in which machine there is provided a means for adjusting the wax applying means so that the constant rate of application of the wax to the brushes may be altered or adjusted as desired.

Other objects and advantages of this invention it is believed will be apparent from the following detailed description of a preferred embodiment thereof as illustrated in the accompanying drawings.

In the preferred embodiment of my invention illustrated in the accompanying drawings, 1 indicates a frame which may be of any suitable or desirable construction, which include side rails 2 upon which roller brushes 3 are mounted on shafts 4 in bearings 5 secured to the side rails 2.

Figure 1:
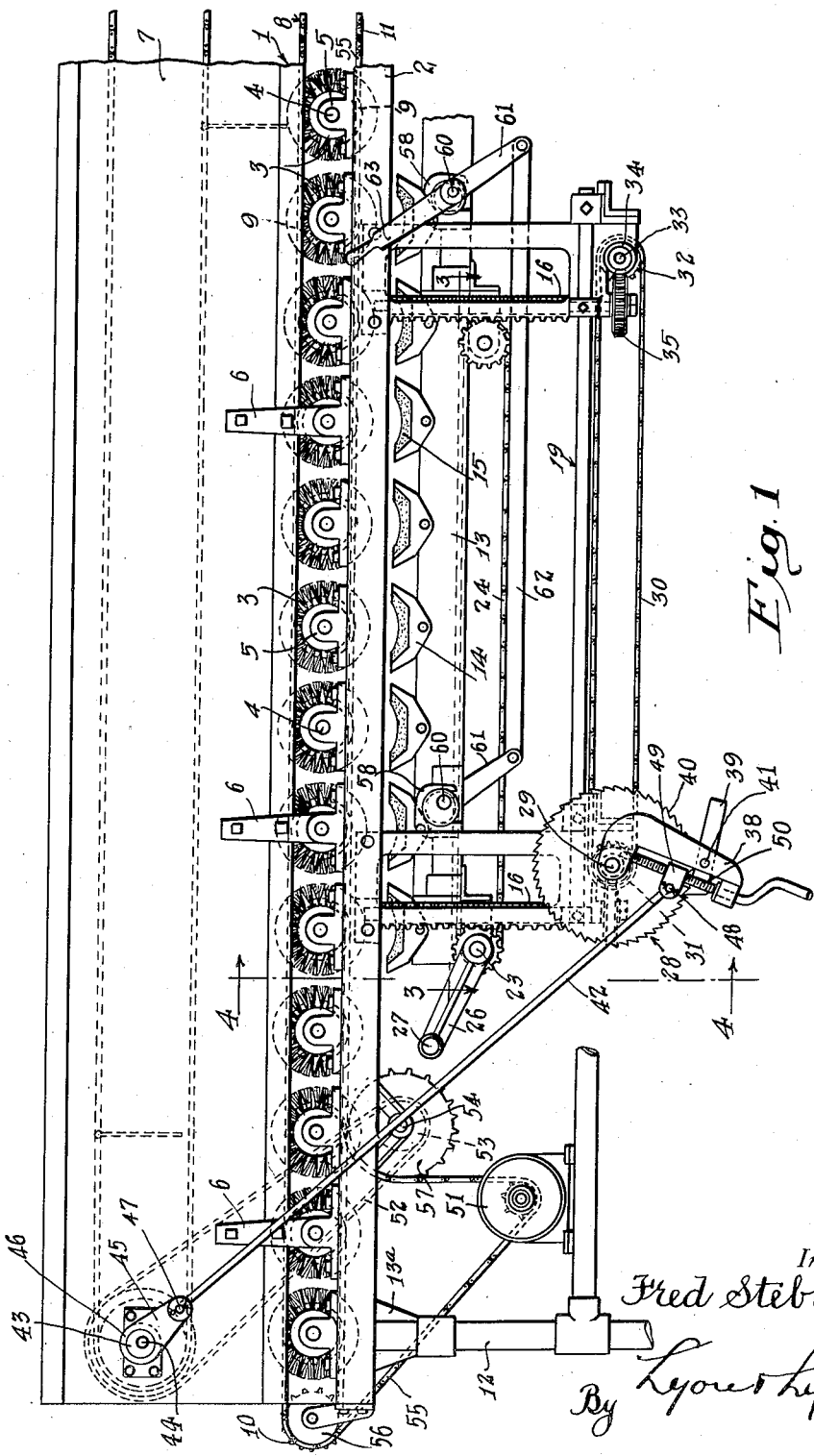
Figure 1 is a side elevation of a fruit waxing and polishing machine embodying my invention.
Figure 2:
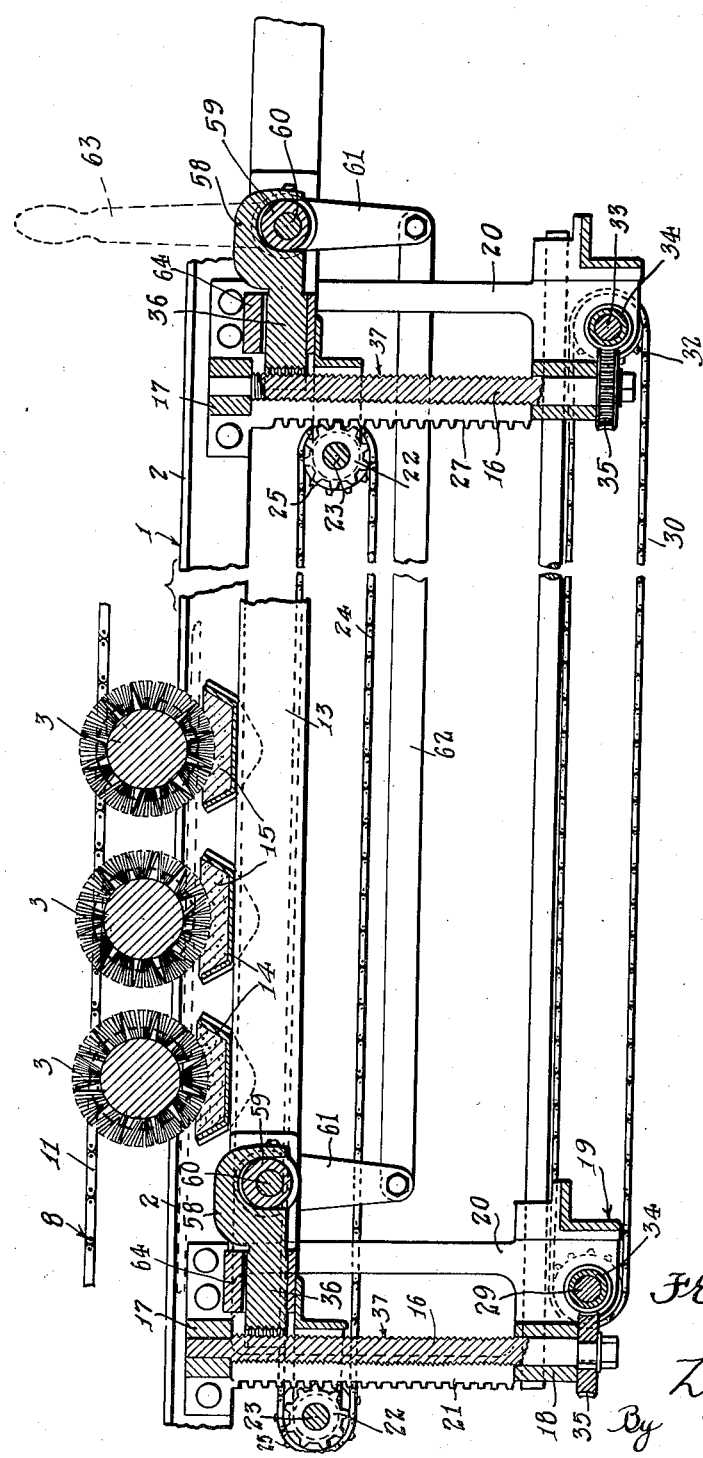
Figure 2 is an enlarged broken sectional elevation thereof.
Figure 3:
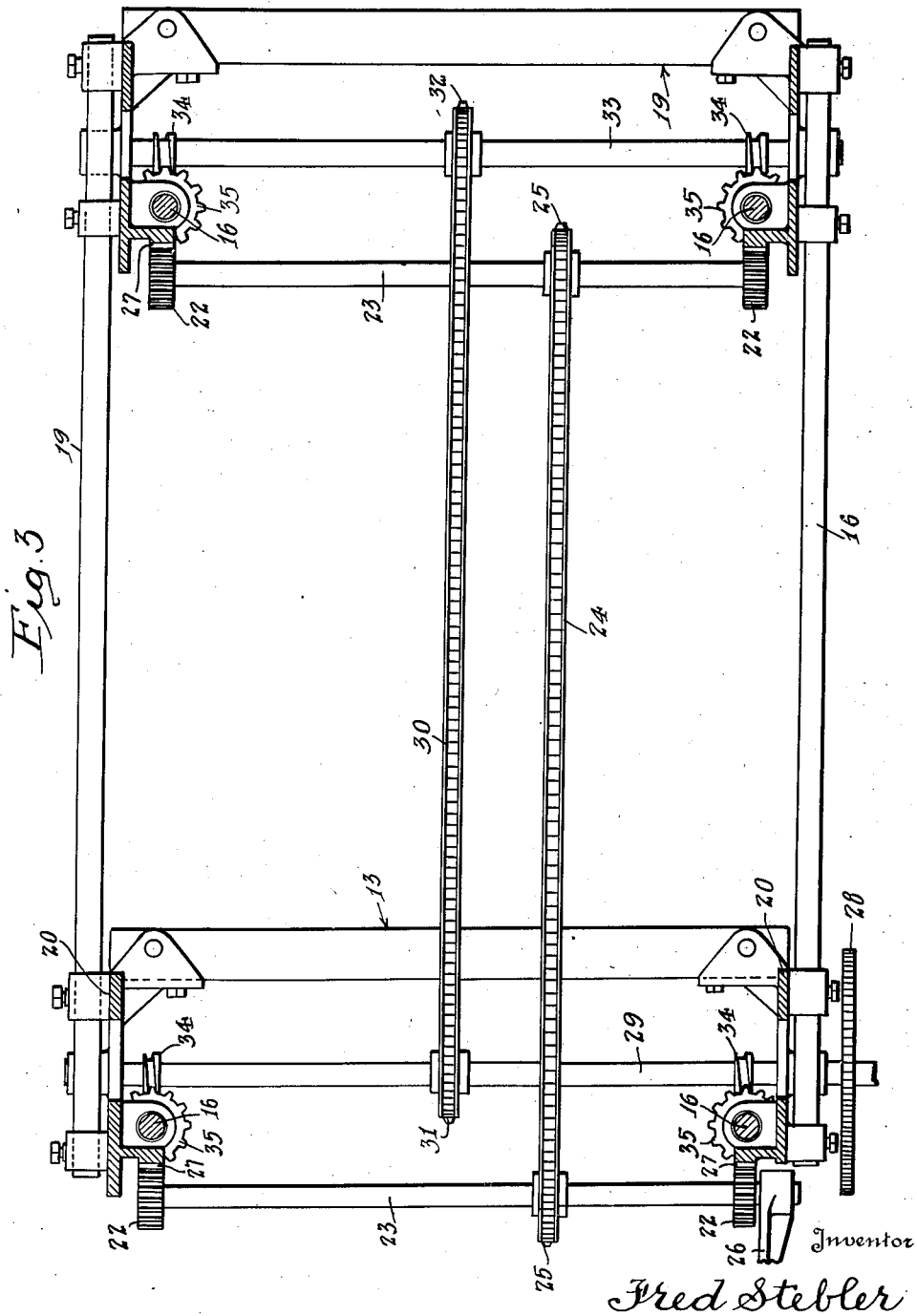
Figure 3 is a plan view partly in section thereof taken substantially on the line 3—3 of Figure 1.
Figure 4:
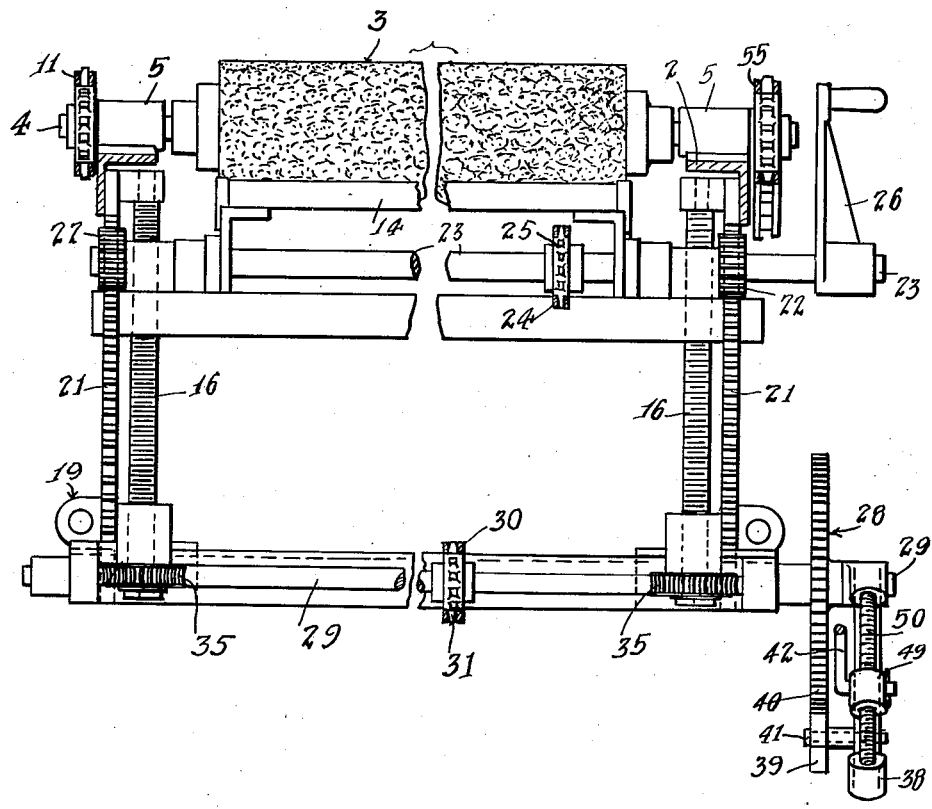
Figure 4 is a broken sectional end elevation thereof taken substantially on the line 4—4 of Figure 1.

Secured to the side rails 2 are brackets 6 to which side plates 7 are secured. The side plates 7 extend down from the upper periphery of the cylindrical brushes 3 and provide means for retaining the fruit on the conveyor provided by the driven cylindrical brushes 3. The cylindrical brushes 3 extend transversely of the direction of travel of the fruit over the conveyor provided by the brushes 3 and are driven in a direction to convey the fruit from the right-hand end of the machine to the left-hand end thereof as indicated in Figure 1. The conveyor formed by the cylindrical brushes is of indefinite length and the wax applying machine embodying my invention is applied to a portion of this conveyor formed of the cylindrical brushes.

The cylindrical brushes 3 are driven in any suitable or desirable manner such, for example, as by means of a run 8 of the chain 55 which is trained over sprockets 9 secured to the shafts 4 of the brushes 3 and at the opposite end of one of the brushes 3 on its shaft 4 is mounted a driven sprocket 10 which is driven by a run 11 of the chain 55 by any suitable or desirable form of motor or drive means 51. The frame 1, including the side rails 2, is supported at intervals by means of posts 12 secured to the side rails 2 in post brackets 13a. Only one of such posts 12 is illustrated in Figure 1 as the posts 12 are spaced along the side rails 2 of the frame 1 at intervals beyond the limits of the fragmentary section of the conveyor as illustrated in Figure 1.

Supported below the rails 2 is a supplementary frame 13 upon which wax holders 14 are secured. Slabs of wax 15 are mounted within the holders 14. The wax 15 is of a non-fluid character and provides a non-fluid coating material for the fruit as it is passed over the conveyor formed of the revolving cylindrical brushes 3. The wax 15 may be of any suitable or desirable composition such, for example, as a paraffin base wax or the like, the composition of which wax forms no part of this invention.

The supplemental frame 13 is supported at its four corners by elevator screws 16. The elevator screws 16 are mounted at their upper ends in bearings 17 secured to the side rails 2 and at their lower ends are supported in bearings 18 of a rectangular subframe 19 suspended from the side rails 2 by means of hangers 20. The elevator screws 16 provide means for elevating the wax holders 14 at a uniform constant rate upward toward the brushes 3 so as to feed the wax 15 to the brushes 3 at a constant uniform rate, independent of the condition of consistency of the wax 15.

In order to support the subframe 13 relative to the rectangular subframe 19, gear racks 21 are formed integral with the hangers 20 and mesh with pinions 22 supported on pinion shafts 23. The pinion shafts 23 are connected together by means of a chain 24 which is trained over sprockets 25 mounted on the spaced shafts 23 adjacent the racks 21 of the four hangers 20. Mounted on one of the shafts 23 is a crank 26 provided with a crank handle 27 operative to rotate one of the shafts 23 and thereby through the chain connection 24, to rotate the other shaft 23, and hence elevate the subframe 13 uniformly carrying the wax holders 14 to position the wax 15 with relation to the rotary brushes 3.

The wax 15 is fed uniformly at a constant rate to the brushes 3 by means of a ratchet wheel 28 which is secured to a worm shaft 29 mounted at one end of the rectangular frame 19. The worm shaft 29 is connected through a chain and sprocket connection consisting of the chain 30 and sprocket 31 secured to the shaft 29 and sprocket 32 secured to the second worm shaft 33 so that as the worm shaft 29 is driven, the worm shaft 33 is driven at a corresponding rate of speed. Worm shafts 29 and 33 are provided with worms 34 near their opposite ends which mesh with worm gears 35 carried at the lower ends of the shaft extensions of the elevator screws 16, thereby rotating the elevator screws 16 as the ratchet wheel 28 is rotated.

In order to elevate the subframe 13, and hence the wax carriers 14 and the wax 15 at a uniform constant rate upwardly toward the brushes 3 to feed the wax 15 at a uniform rate to the brushes 3, threaded half nuts 36 are carried by the subframe 13 in position to engage the threads 37 of the elevating screws 16 so that as the elevating screws 16 are rotated, the threads 37 thereof act upon the threads of the half nuts 36 to elevate the subframe 13 uniformly and to feed the wax 15 uniformly to the brushes 3 irrespective of the consistency of the wax 15.

The wax 15 is timed with relation to the rotation of the brushes 3 and the ratchet wheel 28 is rotated by the following means:

Journaled on the end of the worm shaft 29 is a pawl lever 38 which carries a pawl 39 which is adapted to engage the teeth 40 of the ratchet wheel 28 as the pawl lever 38 is reciprocated. The pawl 39 is pivoted as indicated at 41 in such a manner to normally hold the pawl 39 in engagement with the teeth 40. The pawl lever 38 is reciprocated by means of a reciprocating rod 42 which is driven by means of an eccentric 43 mounted on a driven shaft 44. The rod 42 is pivotally connected to the arm 45 of the eccentric sleeve 46 as indicated at 47 at one end and at its opposite end is pivotally connected as indicated at 48 to a nut 49 mounted on a screw 50 journaled within the ratchet arm 38 so as to adjust the position of the nut 49 along the length of the ratchet arm 38 and to thereby adjust the amount of travel of the ratchet lever 38 and thereby adjust the amount of rotation of the ratchet wheel 28 occasioned by each reciprocation of the ratchet lever 38.

The shaft 44 is driven from the motor 51 by means of a chain 52 which passes over a sprocket 53 attached to the sprocket 57 mounted on a countershaft 54. The motor 51 drives the sprocket 57 through a run of chain 55 which passes over an idler sprocket 56 mounted at the end of the frame 1 and the run of chain 55 passes over the sprockets 10 mounted on the ends of each of the shafts 4 of the cylindrical brushes 3 and returns under the shafts 4 from the opposite end of the conveyor formed by the cylindrical brushes 3 and around a sprocket 57 mounted on the shaft 54 back around the sprocket of the motor 51 as a continuous chain.

In order to provide for the preliminary adjustment of the subframe 13 and the wax 15 with relation to the cylindrical brushes 3, the half nuts 36 are formed integral with pitmen 58 which pass over an eccentric collar 59 secured to shafts 60 mounted in brackets secured to the subframe 13. The two shafts 60 are connected together by means of shaft arms 61 secured to the shafts 60 and linked together by means of a connecting link 62.

One of the shafts 60 is provided with an operating lever 63 for rotating the shafts 60 so that as the shafts 60 are rotated, the eccentric collar 59 is rotated to draw the half nuts 36 away from the elevator screws 16, thereby allowing the rotation of the crank 26 to rotate the pinions 22 with relation to the racks 21 to thereby raise and lower the sub-frame 13 to enable the adjustment of the wax 15 with relation to the cylindrical brushes 3 and likewise to enable the lowering of the subframe 13 for the replacement of the wax 15 when required or desired.

In order to permit this operation, the half nuts 36 are mounted in slides 64 secured to the subframe 13.

It is essential to the operation of the waxing and polishing machine in order to obtain uniform application of the wax to the surface of the fruit, and in order to provide the surface of the fruit with just that amount of wax required for enveloping the fruit with a film of wax, that the wax be fed slowly to the brushes 3 and to be fed to the brushes 3 at a constant and uniform rate as the brushes will pick up a greater quantity of wax if the wax is urged toward the brushes under a constant pressure as the consistency of the wax is reduced by a rise in temperature.

In accordance with my invention it is contemplated that the wax slabs 15 be fed to the brushes 3 at a constant rate of between $\frac{1}{16}$th of an inch to $\frac{3}{8}$th of an inch for eight hours of operation of the brushes 3, and that the rate of feed when set by the setting of the nut 49 upon the screw 50 remain constant during the operation of the machine so that the application of the wax to the surface of all fruit will be uniform. The moving of the nut 49 along the screw 50 provides for a variation in this constant feed in the preferred embodiment of my invention of the sub-frame 13 toward the brushes 3 of $\frac{1}{16}$th of an inch to $\frac{3}{8}$th of an inch in travel in each eight hours of operation of the brushes 3.

Having fully described my invention, it is to be understood that I do not wish to be limited to the details herein set forth, but my invention is of the full scope of the appended claims.

I claim:

1. In a device of the class described, the combination of a fruit conveying means including wax applying brushing means, waxing means for applying solid wax to the brushing means at a uniform constant rate, and means for adjusting the waxing means to alter the constant rate of application of the wax to the brushing means.

2. A fruit waxing applicator including fruit brushing means, means to support forms of solid wax, means to present the wax to the brushing means at a uniform constant rate, and means for adjusting the latter said means to alter the constant rate of presentation of the wax to the brushing means.

3. In a fruit waxing and polishing device, the combination of a brushing means, waxing means for applying solid wax to the brushing means at a uniform constant rate, and means for adjusting the waxing means to alter the constant rate of presentation of the wax to the brushing means.

4. In a machine for applying wax to the surface of fruit, the combination of a series of brushes, means for rotating the brushes, slab wax-holding means, and means timed with relation to the rotation of the brushes for feeding the wax-holding means to the brushes at a uniform constant rate.

5. In an apparatus for applying a coating to fruit, comprising brushing means adapted to contact the surface of the fruit, means for retaining a non-fluid coating material, and means for presenting the coating material to the brushing means at a uniform rate of speed independent of the consistency of the non-fluid coating material.

6. In an apparatus for applying wax to the surfaces of fruit, the combination of a plurality of brushes adapted to form a support for the fruit, means for driving the brushes to revolve the same in contact with the surface of the fruit, the fruit being caused to travel along the path provided by the brushes, means for holding cakes of cold wax, means for feeding the wax to the brushes at a uniform rate so that the wax will be transferred at a uniform rate from the cakes of wax to the fruit independently of the conditions of temperature of wax and fruit.

7. In an apparatus for applying wax to the surface of fruit, the combination of a plurality of brushes adapted to form a support for the fruit, means for driving the brushes to revolve the same in contact with the surface of the fruit, the fruit being caused to travel along the path provided by the brushes, means for holding wax, means for feeding the wax to the brushes at a uniform rate so that the wax will be transferred by the brushes from the cake to the fruit at a uniform rate independently of the conditions of temperature of the wax and the fruit, and means for adjusting the feeding means to vary the rate of uniform feed of the wax to the brushes.

8. In an apparatus for applying a polishing medium to the surface of fruit, the combination of a plurality of fruit polishing elements adapted to support the fruit, means for driving the fruit polishing elements in contact with the surface of the fruit, means for moving the fruit over the polishing elements along the path defined by the polishing elements, means for holding a polishing medium, and means for feeding the polishing medium to the polishing elements at a constant uniform rate so that the polishing medium will be transferred to the fruit by the polishing elements independently of the conditions of temperature of the wax and fruit.

9. In an apparatus for applying wax to the surface of the fruit, the combination of a frame, a plurality of cylindrical spaced brushes mounted in the frame transversely thereof to provide a path over which fruit is caused to travel, means for revolving the brushes, means below the frame adapted to hold a plurality of cakes of wax in contact with the under surfaces of some of said brushes, and means operatively connected with the brush drive for moving the means for supporting the cakes of wax to the surfaces of the brushes at a uniform constant rate.

10. In an apparatus for applying wax to the surfaces of fruit, the combination of a frame, a plurality of cylindrical spaced brushes mounted in the frame transversely thereof to provide a path over which fruit is caused to travel, means for revolving the brushes, means below the frame adapted to hold a plurality of cakes of wax in contact with the under surfaces of some of said brushes, means operatively connected with the brush drive for moving the means for supporting the cakes of wax to the surfaces of the brushes at a uniform constant rate, and means operable to change the uniform constant rate at which the feeding means feeds the wax to the surface of the brushes.

11. In an apparatus for applying wax to the surface of the fruit, the combination of a frame, a plurality of cylindrical spaced brushes mounted in the frame transversely thereof to provide a path over which fruit is caused to travel, means for revolving the brushes, means below the frame adapted to hold a plurality of cakes of wax in contact with the under surfaces of some of said contact with the under surfaces of some of said brushes, means operatively connected with the brush drive for moving the means for supporting the cakes of wax to the surfaces of the brushes at a uniform constant rate, and means for bodily moving the wax supporting means away from said brushes to permit the reloading of the same with wax.

12. In an apparatus for applying wax to the surface of fruit, the combination of a plurality of brushes adapted to form a support for the fruit, and said brushes providing a path over which the fruit moves, means for driving the brushes to revolve the brushes in contact with the surface of the fruit, means for holding cakes of solid wax, means operative for feeding the cakes of solid wax to the brushes at a uniform rate so that the wax will be transferred by the brushes from the cakes to the fruit at a uniform rate independent of the conditions of temperature of the wax and fruit to vary the rate of uniform feed of the wax to the brushes.

13. In an apparatus for applying wax to the surface of a fruit, the combination of a frame, a plurality of cylindrical fruit-supporting brushes mounted in said frame transverse to the path of travel of the fruit over which the fruit is caused to travel, means for rotating the brushes, means adapted to hold a plurality of cakes of wax in contact with the surfaces of some of said brushes, means operatively connected with the brush drive for moving the plurality of wax cakes into contact with the surface of the brushes at a uniformly constant rate, means for disengaging the said operatively connected means for moving the wax cakes into contact with the brushes, and means for bodily and speedily moving the wax-supporting means away from said brushes to permit reloading the same with the wax and then moving the wax-supporting means back into contact with the brushes and re-engaging the said operatively connected means.

14. In an apparatus for applying wax to the surface of fruit, the combination of a frame, a plurality of spaced brushes mounted in the frame transversely thereof to provide a path over which the fruit is caused to travel, means for revolving the brushes, means adapted to hold a plurality of cakes of wax in contact with the surfaces of some of said brushes, means operatively connected with the brush drive means for moving the means for supporting the cakes of wax to the surface of the brushes at a uniformly constant rate, means for disconnecting the last said means with the brush drive means, and other means for bodily moving the wax-supporting means away from the brushes to permit reloading of the same with wax.

15. In a device for treating the surface of fruit with wax, the combination of a fruit-conveying means including wax-applying brushes, means for supporting slabs of wax, means for moving the wax-supporting means at a constantly uniform rate toward the brushing means to apply wax to the brushing means uniformly independent of the conditions of temperature, means for bodily moving the wax-supporting means away from said brushes to permit reloading of the same with wax, and then moving the wax-supporting means bodily back into contact with the brushing means to permit the reloaded wax to be fed to the brushing means at a constantly uniform rate.

16. In a fruit waxing machine, a runway upon which the fruit may be supported and advanced therealong, said runway including a substantially cylindrical brushing element over which the fruit is passed in contact therewith, means for driving said brushing element, means for supporting a cake of wax in engagement with said brushing element for transfer by the brushing element to the surface of the fruit engaging therewith, and means for advancing said wax-supporting means toward the brushes at a controlled uniform rate to feed the wax against the brushes at a uniform rate irrespective of temperature variations affecting the consistency of the wax.

17. A fruit waxing machine including a plurality of substantially cylindrical brushes arranged in side by side relation to support pieces of fruit therebetween, means for driving said brushes, means for supporting cakes of wax in engagement with certain of said brushes for transfer by the brushes to the surface of the fruit supported thereon, and means for advancing said wax-supporting means toward the brushes at a controlled uniform rate so that the brushes pick up the wax from the cakes of wax at a uniform rate irrespective of the temperature variations affecting the consistency of the wax.

FRED STEBLER.